(12) United States Patent
Fuchino et al.

(10) Patent No.: US 8,511,210 B2
(45) Date of Patent: Aug. 20, 2013

(54) LAMINATED MATERIAL CUTTING METHOD, LAMINATED MATERIAL, HEAD SUSPENSION MANUFACTURING METHOD, AND HEAD SUSPENSION

(75) Inventors: Hideki Fuchino, Aikoh-gun (JP); Hidenori Inoue, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 522 days.

(21) Appl. No.: 12/712,559

(22) Filed: Feb. 25, 2010

(65) Prior Publication Data
US 2010/0221479 A1 Sep. 2, 2010

(30) Foreign Application Priority Data

Feb. 27, 2009 (JP) ................................. 2009-047334

(51) Int. Cl.
*B26D 1/00* (2006.01)

(52) U.S. Cl.
USPC ................................................. 83/13; 216/22

(58) Field of Classification Search
USPC ............ 83/49, 25; 72/43, 372, 16.3; 451/28; 438/462, 460; 428/826, 43, 40.9, 156; 425/406, 394; 360/266, 246.1, 245.2, 244.8, 360/244.5, 244.3, 244.2, 244; 348/239; 310/12.16; 29/609, 603.03, 596, 564.6, 564.2, 29/428; 264/480; 156/598, 443, 261
See application file for complete search history.

(56) References Cited

U.S. PATENT DOCUMENTS

| 5,903,441 | A  | * | 5/1999 | Dean et al. ..................... 361/756 |
| 2002/0051321 | A1 | * | 5/2002 | Takagi et al. ............... 360/245.2 |
| 2004/0074353 | A1 | * | 4/2004 | Van Dalen et al. ................ 83/13 |
| 2005/0024777 | A1 | * | 2/2005 | Kidachi et al. ............. 360/244.5 |

FOREIGN PATENT DOCUMENTS

| JP | 8-107169 | 4/1996 |
| JP | 2000-057723 | 2/2000 |

* cited by examiner

*Primary Examiner* — Duy Deo
*Assistant Examiner* — Erin Bergner
(74) *Attorney, Agent, or Firm* — Jordan and Hamburg LLP

(57) ABSTRACT

A method of cutting a laminated material 10A made of at least first and second plates that are laid one on another and fixed together includes holding the laminated material 10A between a pad 71 and a clamp base 73, so that an edge 14*a* of the first plate 14 is positioned between an edge 71*a* of the pad 71 and an edge 73*a* of the clamp base 73; and cutting a protrusion of the second plate 12 protruding from the edge 14*a* of the first plate 14 by moving a punch 75 along the pad 71 in a direction from the second plate 12 toward the first plate 14 and by using the first plate 14 as a die to cut the protrusion of the second plate 12. The method is capable of precisely cutting the protrusion of the second plate 12 protruding from the edge 14*a* of the first plate 14 through a reduced number of processes.

8 Claims, 9 Drawing Sheets

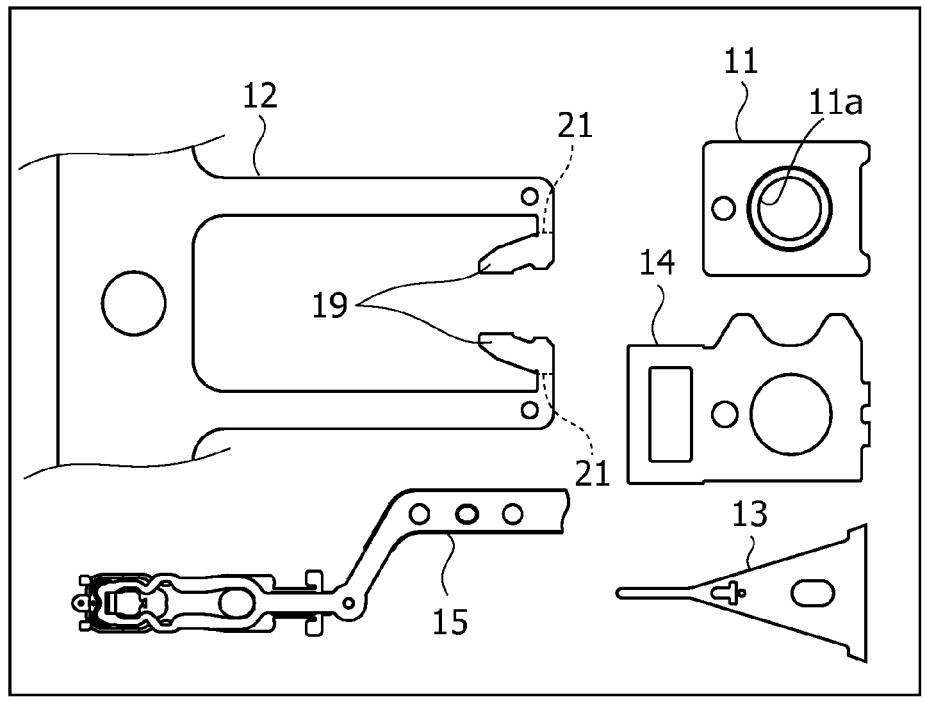
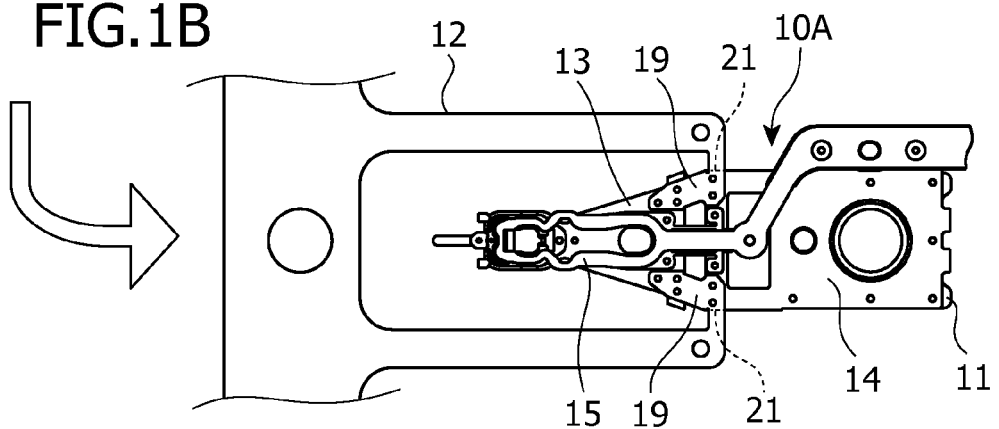
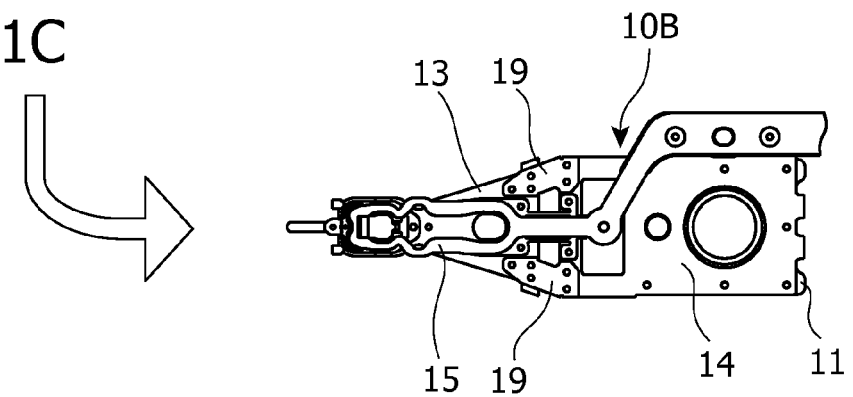

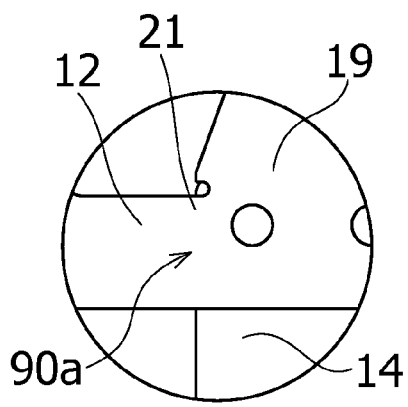
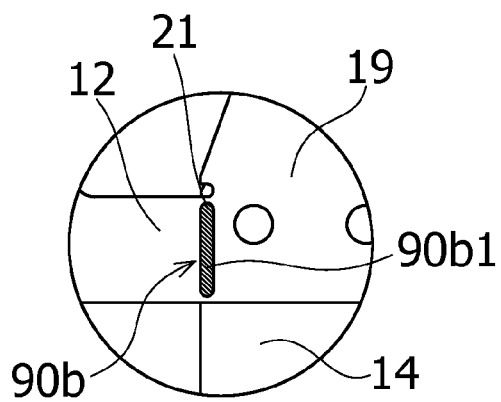
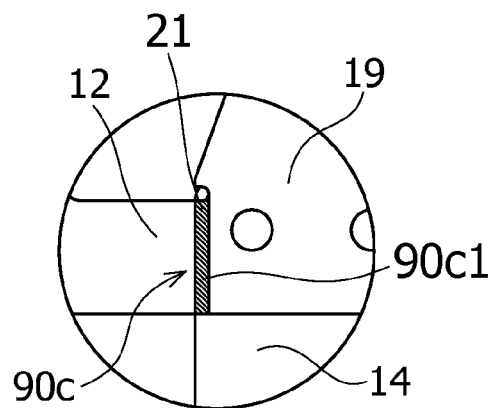
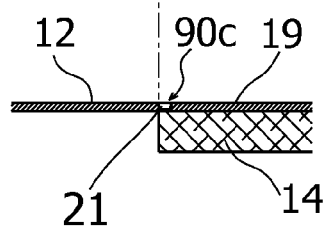

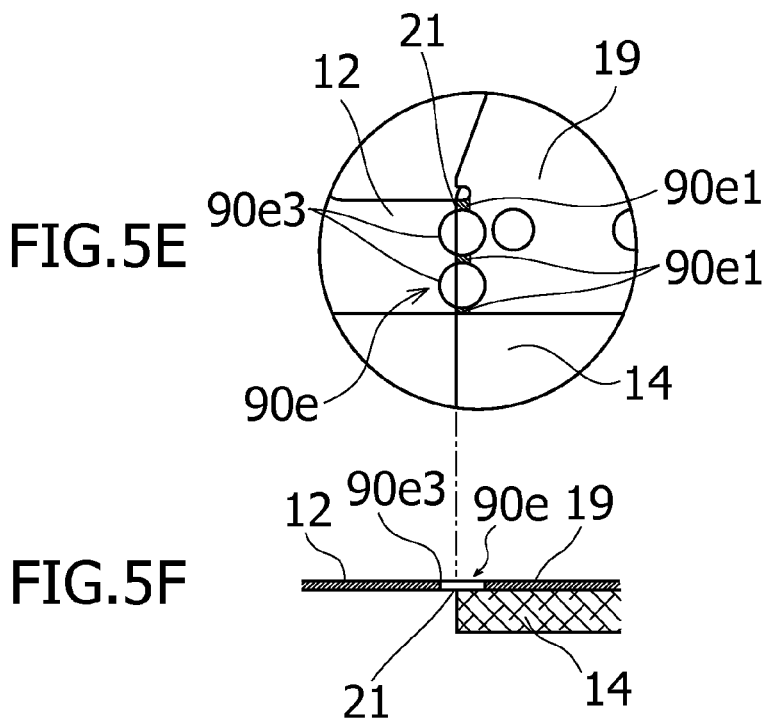
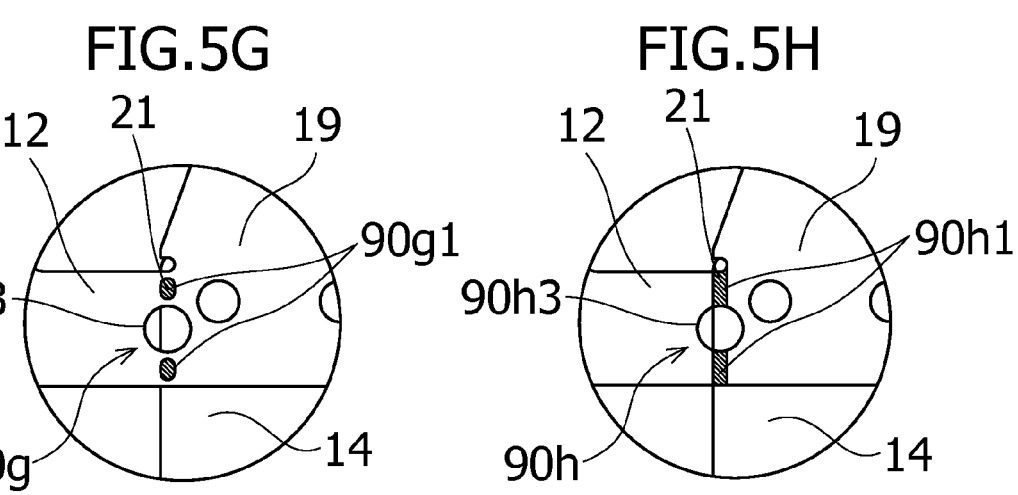

US 8,511,210 B2

LAMINATED MATERIAL CUTTING METHOD, LAMINATED MATERIAL, HEAD SUSPENSION MANUFACTURING METHOD, AND HEAD SUSPENSION

BACKGROUND OF THE INVENTION

1. Field of the Invention

The present invention relates to a head suspension used in a disk drive incorporated in an information processing apparatus such as a personal computer. In particular, the present invention relates to a method of cutting a half-finished laminated material such as a half-finished head suspension into a finished product.

2. Description of Related Art

A magnetic recording apparatus writes and reads data to and from a magnetic disk or a magneto-optical disk with the use of a magnetic head that is resiliently supported with a head suspension. The magnetic head includes a slider that faces a recording surface of the disk and a transducer that is incorporated in the slider. When the disk is turned at high speed, the slider slightly rises from the surface of the disk, to form an air bearing between the disk and the slider.

The head suspension that resiliently supports the magnetic head includes a load beam, a flexure made of a thin plate spring joined with the load beam, and a base plate resiliently supporting the load beam. A front end of the flexure supports the slider having the magnetic head.

Parts of the head suspension such as the load beam and base plate are formed from a metal thin plate such as a stainless steel thin plate by punching or etching. These parts are assembled and fixed together by, for example, laser spot welding, to form the head suspension.

According to a related art disclosed in Japanese Unexamined Patent Application Publication No. 2000-57723, each part of the head suspension is made from a frame by punching or etching, the frame having a plurality of the same parts chained at predetermined pitches. Such frames are assembled and fixed together by, for example, laser spot welding, to form half-finished head suspensions chained at regular intervals. The half-finished head suspensions are cut from the frames into individual head suspensions.

To cut the half-finished head suspension into an individual head suspension, the half-finished head suspension is held between a die and a pad and a punch is moved along the pad.

Cutting half-finished head suspensions into individual head suspensions involves precise positioning. To achieve this, tools including the die, pad, and punch must maintain high accuracy. As the tools are used, they wear. To maintain high accuracy for the tools, maintenance must properly be repeated. Namely, accurately cutting half-finished head suspensions into individual head suspensions increases the number of manufacturing processes.

SUMMARY OF THE INVENTION

An object of the present invention is to provide a method of cutting a laminated material such as a half-finished head suspension with high positioning accuracy without increasing the number of manufacturing processes.

In order to accomplish the object, an aspect of the present invention provides a method of cutting a laminated material made of at least first and second plates that are laid one on another and fixed together. The method includes holding the laminated material between a pad and a clamp base, so that an edge of the first plate is positioned between an edge of the pad and an edge of the clamp base; and cutting a protrusion of the second plate protruding from the edge of the first plate by moving a punch along the pad in a direction from the second plate toward the first plate and by using the first plate as a die to cut the protrusion of the second plate.

According to this aspect of the present invention, the first plate functions as a die to cut the second plate. With this, cutting the protrusion of the second plate protruding from the edge of the first plate is executable with high positioning accuracy without frequent maintenance, thereby greatly reducing the number of times of maintenance of the pad, clamp base, and punch.

Namely, this aspect of the present invention is capable of cutting a laminated material with high positioning accuracy without increasing the number of processes.

BRIEF DESCRIPTION OF THE DRAWINGS

FIG. 1A is a plan view illustrating parts of a head suspension before assembling;

FIG. 1B is a plan view illustrating a half-finished head suspension assembled on a frame;

FIG. 1C is a plan view illustrating a head suspension cut from the frame of FIG. 1B;

FIG. 5A illustrates Example 1 of an easy cut part formed on a laminated material;

FIG. 5B illustrates Example 2 of an easy cut part formed on a laminated material;

FIG. 5C illustrates Example 3 of an easy cut part formed on a laminated material;

FIG. 5D is a sectional view illustrating the easy cut part of FIG. 5C;

FIG. 5E illustrates Example 4 of an easy cut part formed on a laminated material;

FIG. 5F is a sectional view illustrating the easy cut part of FIG. 5E;

FIG. 5G illustrates Example 5 of an easy cut part formed on a laminated material;

FIG. 5H illustrates Example 6 of an easy cut part formed on a laminated material;

DETAILED DESCRIPTION OF EMBODIMENTS

A laminated material cutting method, a laminated material, a head suspension manufacturing method, and a head suspension according to embodiments of the present invention will be explained.

Figure 2:
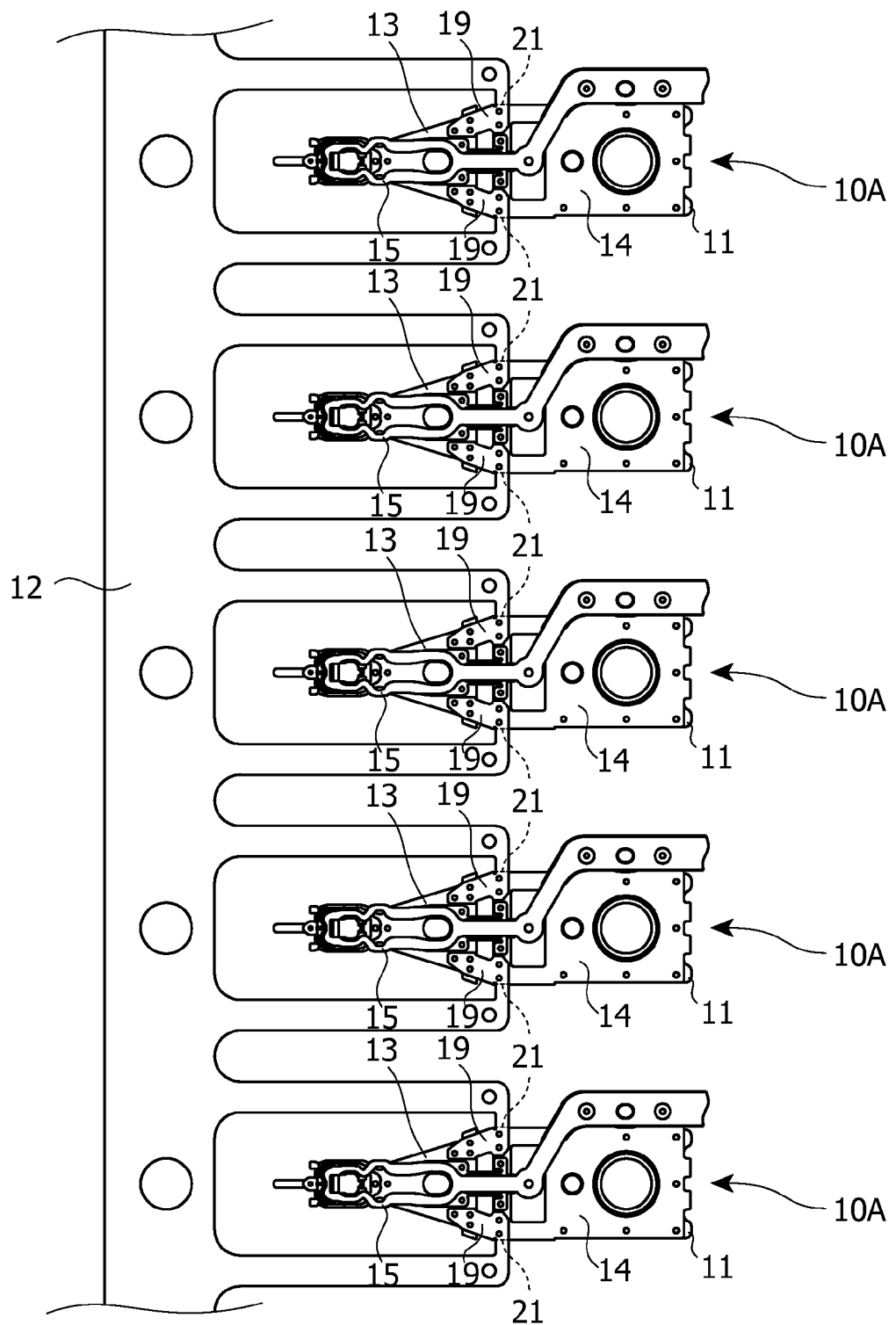
FIG. 2 is a plan view illustrating half-finished head suspensions chained side by side on a frame.

FIGS. 1A to 1C illustrate a head suspension manufactured by using a laminated material cutting method according to an embodiment of the present invention, in which FIG. 1A is a plan view illustrating parts of the head suspension before assembling, FIG. 1B is a plan view illustrating a half-finished head suspension assembled on a frame, and FIG. 1C is a plan view illustrating the head suspension cut from the frame of FIG. 1B. FIG. 2 illustrates half-finished head suspensions chained side by side on a frame.

The half-finished head suspension 10A corresponds to the "laminated material" stipulated in the claims and includes a base plate 11, a load beam 13, a stiffener 14, a flexure 15, and a hinge member 19 that are fixed together by, for example, laser spot welding.

One of the base plate 11, load beam 13, and stiffener 14 corresponds to the "first plate" stipulated in the claims and the frame 12 and hinge member 19 correspond to the "second plate" stipulated in the claims.

The base plate 11 is made from a base material such as a stainless thin plate having a thickness in the range of, for example, 150 to 200 μm. The base material is punched or etched into the base plate 11. The base plate 11 has a circular boss 11a that is fixed to a front end of an actuator arm (not illustrated) driven by a voice coil motor (not illustrated). The voice coil motor drives the base plate 11 in a sway (widthwise) direction.

The load beam 13 is made from a base material such as a stainless thin plate having resiliency and a thickness in the range of, for example, 30 to 150 μm. The base material is etched into the load beam 13. The load beam 13 resiliently supports a magnetic head slider (not illustrated) and serves as a spring to form an air bearing.

The stiffener 14 is made from a base material such as a stainless thin plate having resiliency and a thickness in the range of, for example, 150 to 200 μm. The base material is etched into the stiffener 14. The stiffener 14 is used to connect the base plate 11 and hinge member 19 to each other. When used for a head suspension employing a dual actuator system, the stiffener 14 functions to support a piezoelectric ceramic element.

The flexure 15 is made of a stainless thin plate that has resiliency and a thickness in the range of, for example, 20 to 30 μm. The flexure 15 is thinner and more precise than the load beam 13. The flexure 15 has a layered structure including a conductive base layer (not illustrated) made of stainless steel, an electric insulating layer (not illustrated) made of polyimide resin, and a conductor layer (not illustrated) made of copper. The flexure 15 functions as a support to support the magnetic head slider and as a wiring member to transmit signals to and from the magnetic head slider and supply power.

The hinge member 19 is made from a base material such as a stainless thin plate that is thin and precise and has a thickness in the range of, for example, 20 to 30 μm. The base material is etched into the hinge member 19. The hinge member 19 functions to connect the load beam 13 and stiffener 14 to each other and is integral with the frame 12 on which a plurality of half-finished head suspensions are chained as illustrated in FIGS. 1B and 2.

The hinge member 19 is integral with the frame 12 and there is a boundary 21 between the hinge member 19 and the frame 12 as illustrated in FIG. 1A. The frame 12 has a plurality of such hinge members 19 as illustrated in FIG. 2.

Like the hinge member 19, a number of each of the parts 11, 13, 14, and 15 of the head suspension are formed on a frame and such parts with frames are joined with the frame 12 and fixed to one another, to prepare the chained half-finished head suspensions 10A illustrated in FIG. 2. In FIG. 2, each half-finished head suspension 10A is connected to the frame 12 through the boundary 21 of the hinge member 19.

The boundary 21 of the hinge member 19 of the half-finished head suspension 10A is an object to which the laminated material cutting method of the present invention is applied to separate, along the boundary 21, the half-finished head suspension 10A from the frame 12 into a finished head suspension 10B illustrated in FIG. 1C.

Figure 3:
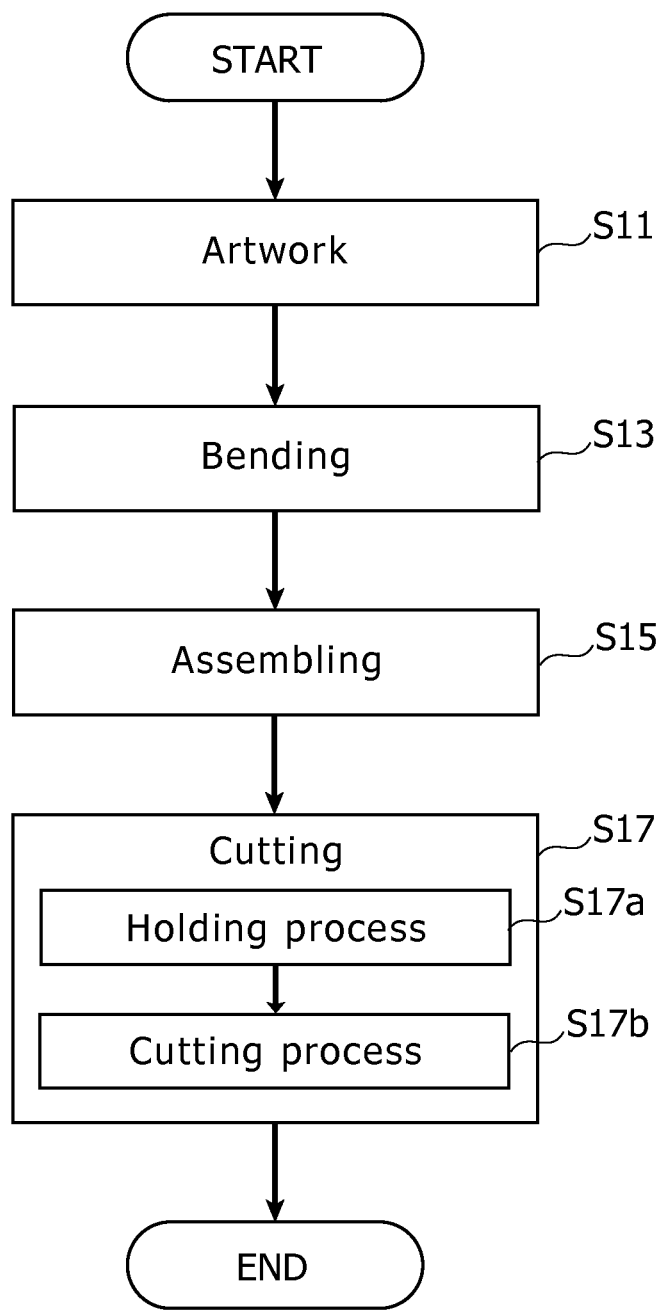
FIG. 3 is a flowchart illustrating a head suspension manufacturing method according to an embodiment of the present invention.

FIG. 3 is a flowchart illustrating a head suspension manufacturing method according to an embodiment of the present invention. This method is based on the laminated material cutting method of the present invention.

Step S11 of FIG. 3 is artwork to form a number of each of the parts 11, 13, 14, and 15 of the head suspension from a base material by punching or etching. The parts thus formed are connected to the frame 12 in step S11, as illustrated in FIG. 2.

Step S13 is a bending process to bend, for example, a part of the load beam 13 into a support part for supporting a magnetic head slider.

Step S15 is an assembling process to fix the parts to one another with the use of, for example, a laser spot welder. If a high assembling accuracy is required, the parts may not be chained on the frame 12. Instead, the parts may be in the form of separated parts that are fixed to each other.

Step S17 is a cutting process to apply the laminated material cutting method of the present invention to the boundary 21, to form the head suspension 10B of FIG. 1C. Step S17 includes step S17a to carry out a holding process and step S17b to carry out a cutting process.

The laminated material cutting method carried out in step S17 will be explained in detail with reference to FIGS. 4A to 4C. In the following explanation, the method is used to cut the half-finished head suspension 10A illustrated in FIG. 1B from the frame 12 along the boundary 21 into the head suspension 10B illustrated in FIG. 1C. Accordingly, in the following explanation, the half-finished head suspension 10A corresponds to the laminated material, the stiffener 14 of the half-finished head suspension 10A corresponds to the first plate of the laminated material, and the frame 12 of the half-finished head suspension 10A corresponds to the second plate of the laminated material.

Figure 4A:
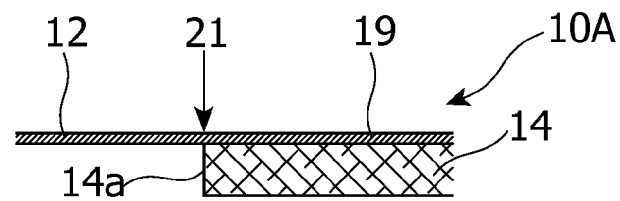
FIG. 4A is a sectional view illustrating the half-finished head suspension (a laminated material) of FIG. 1B having a hinge member integral with the frame and a stiffener laid on and fixed to the hinge member.
Figure 4B:
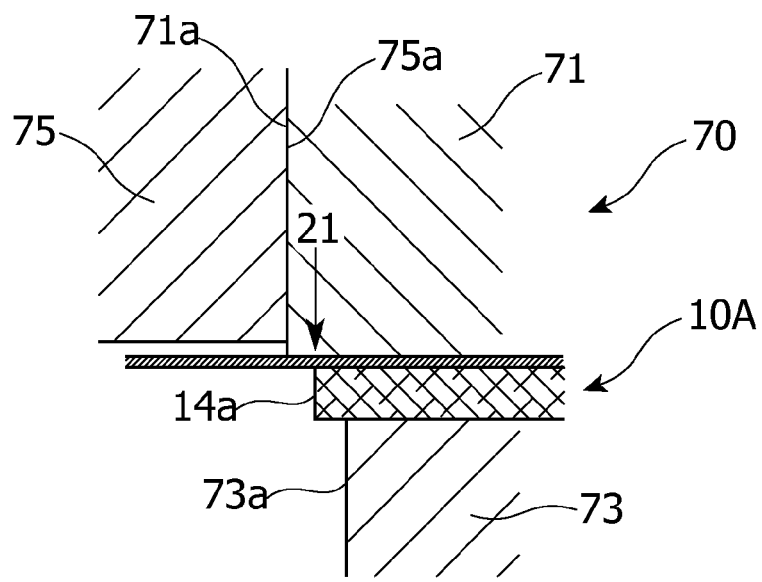
FIG. 4B illustrates a process of holding the laminated material.
Figure 4C:
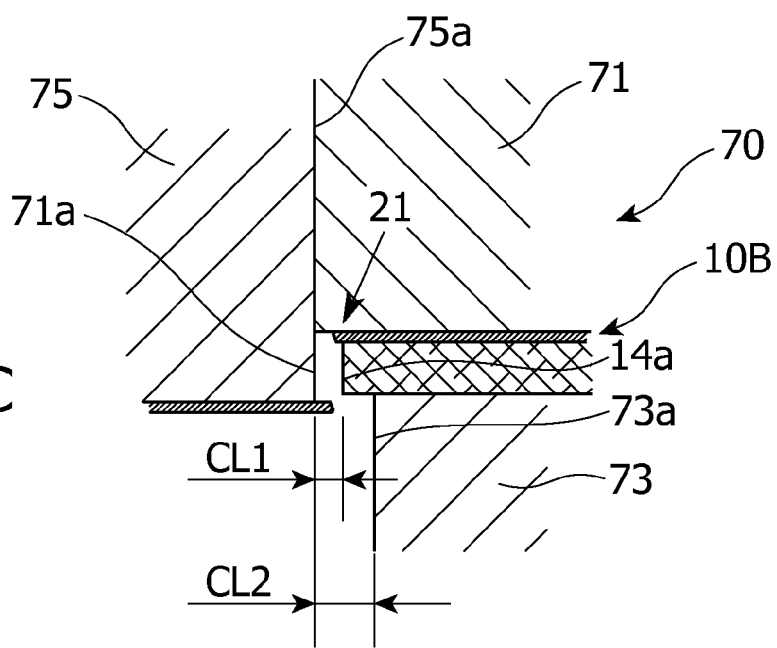
FIG. 4C illustrates a process of cutting the laminated material.

FIG. 4A illustrates the hinge member 19 and stiffener 14 that are laid one on another and fixed together to form the laminated material, FIG. 4B illustrates a process of holding the laminated material, and FIG. 4C illustrates a process of cutting the laminated material.

To form the half-finished head suspension 10A illustrated in FIGS. 1B and 2, the stiffener 14 and hinge member 19 each being in a chained state are fixed to each other on the frame 12. The hinge member 19 is integral with the frame 12 along the boundary 21.

The half-finished head suspension 10A (laminated material) is cut off from the frame 12 according to the laminated material cutting method of the present invention that includes the holding process and cutting process. The holding process (step S17a) holds the half-finished head suspension 10A between a pad 71 and a clamp base 73 of a cutting apparatus 70. The cutting process (step S17b) cuts a protrusion of the frame 12 (second plate) protruding from an edge 14a of the stiffener 14 (first plate) by moving a punch 75 along the pad 71.

The pad 71, clamp base 73, and punch 75 are tools to form the cutting apparatus 70.

In FIG. 4B, the holding process positions the edge 14a of the stiffener 14 between an edge part 71a of the pad 71 and an edge part 73a of the clamp base 73.

In FIG. 4C, the cutting process moves the punch 75 in a direction from the frame 12 toward the stiffener 14 and cuts the frame 12 with the stiffener 14 of the half-finished head suspension 10B serving as a die to cut the frame 12.

The edge part 75a of the punch 75 is in contact with the edge part 71a of the pad 71. The punch 75 is moved with the edge part 75a moving along the edge part 71a of the pad 71. Moving the punch 75 in the direction from the frame 12 toward the stiffener 14 results in cutting the frame 12 along the boundary 21. The boundary 21 may be provided with an easy cut part such as a hole or a groove to make the frame 12 easily be cut. The easy cut part will be explained later in detail.

In the half-finished head suspension 10A including the hinge member 19 and stiffener 14 that are laid one on another and fixed together, the edge 14a of the stiffener 14 corresponds to the boundary 21 of the frame 12 connected to the hinge member 19. Along the boundary 21, the frame 12 is cut. At this time, the stiffener 14 is used as a die to cut the frame 12.

The stiffener 14 of the half-finished head suspension 10B is weaker in strength than the clamp base 73. However, the stiffener 14 is used as a die only once to cut off the half-finished head suspension 10A from the frame 12.

Accordingly, the stiffener 14 sufficiently serves as a die even if it is weak in strength. Meanwhile, the clamp base 73 is not required to serve as a die and is required only to hold the half-finished head suspension 10A at a predetermined position. The clamp base 73, therefore, is little damaged during the cutting process. This results in reducing the number of times of maintenance of the clamp base 73, thereby reducing the number of manufacturing processes of the head suspension.

According to the laminated material cutting method of the embodiment, there is no need of precise management of the degrees of roughness for the edge part 71a of the pad 71 and the edge part 75a of the punch 75. This is because the frame 12 is cut along the boundary 21 that is shifted from the edge parts 71a and 75a. This results in reducing the number of manufacturing processes of the head suspension.

According to the laminated material cutting method of the embodiment, the half-finished head suspension 10A is positioned with respect to the cutting apparatus 70 such that the edge part 71a of the pad 71 is positioned to protrude by a distance CL1 (FIG. 4C) from the edge 14a of the stiffener 14. Then, the edge part 75a of the punch 75 is automatically positioned relative to the edge part 71a of the pad 71. There is no need of precisely managing a distance CL2 (FIG. 4C) between the edge part 75a of the punch 75 and the edge part 73a of the clamp base 73 because the clamp base 73 is required only to hold the half-finished head suspension 10A at a predetermined position. This results in reducing the number of manufacturing processes of the head suspension.

If cutting a part of the frame 12 protruding from the edge 14a of the stiffener 14 must be carried out with a submicron-order positioning accuracy, the positioning of the edge parts 71a and 75a and the like must be carried out with a submicron-order accuracy.

On the other hand, according to the laminated material cutting method of the embodiment, the distance CL2 (FIG. 4C) between the edge part 75a of the punch 75 and the edge part 73a of the clamp base 73 is allowed to be relatively large such as about 0.1 mm.

Also, positioning the half-finished head suspension 10A with respect to the cutting apparatus 70 is carried out by positioning the edge 14a of the stiffener 14 between the edge part 71a of the pad 71 and the edge part 73a of the clamp base 73. This only requires an accuracy of half the distance CL2 (0.1 mm), i.e., 0.05 mm.

Next, examples of the easy cut part formed along the boundary 21 on the frame 12 will be explained with reference to FIGS. 5A to 5H.

FIG. 5A illustrates Example 1 of an easy cut part formed on a laminated material, FIG. 5B illustrates Example 2 of an easy cut part formed on a laminated material, FIG. 5C illustrates Example 3 of an easy cut part formed on a laminated material, FIG. 5D is a sectional view illustrating the easy cut part of FIG. 5C, FIG. 5E illustrates Example 4 of an easy cut part formed on a laminated material, FIG. 5F is a sectional view illustrating the easy cut part of FIG. 5E, FIG. 5G illustrates Example 5 of an easy cut part formed on a laminated material, and FIG. 5H illustrates Example 6 of an easy cut part formed on a laminated material.

In the examples illustrated in FIGS. 5A to 5H, the stiffener 14 is fixed to the bottom surface of the frame 12.

According to Example 1 illustrated in FIG. 5A, the easy cut part 90a is not particularly processed along the boundary 21 on the frame 12. This easy cut part 90a corresponds to that illustrated in FIGS. 4A to 4C.

According to Example 2 illustrated in FIG. 5B, the easy cut part 90b consists of an oblong groove 90b1 formed by partial etching along a part of the boundary 21 on the frame 12.

According to Example 3 illustrated in FIGS. 5C and 5D, the easy cut part 90c consists of a straight groove 90c1 formed by partial etching entirely along the boundary 21 on the frame 12.

According to Example 4 illustrated in FIGS. 5E and 5F, the easy cut part 90e consists of two through holes 90e3 formed in the frame 12 on the boundary 21 and three straight grooves 90e1 formed on each side of the through holes 90e3 by partial etching up to a tip of the boundary 21.

According to Example 5 illustrated in FIG. 5G, the easy cut part 90g consists of one through hole 90g3 formed in the frame 12 on the boundary 21 and two oblong grooves 90g1 formed on each side of the through hole 90g3 by partial etching along the boundary 21 on the frame 12.

According to Example 6 illustrated in FIG. 5H, the easy cut part 90h consists of one through hole 90h3 formed in the frame 12 on the boundary 21 and two straight grooves 90h1 formed on each side of the through hole 90h3 by partial etching up to a tip of the boundary 21.

Next, cutting the half-finished head suspension 10A (laminated material) from the frame 12 along the easy cut part 90e (FIGS. 5E and 5F) formed on the boundary 21 on the frame 12 will be explained with reference to FIGS. 6A to 8.

Figure 6A:
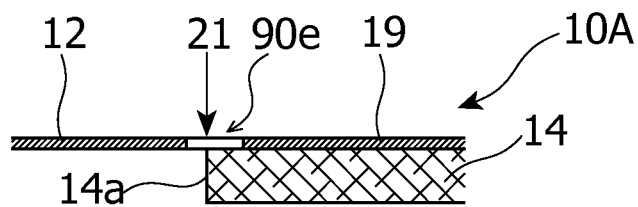
FIG. 6A illustrates the laminated material having the easy cut part of FIGS. 5E and 5F.
Figure 6B:
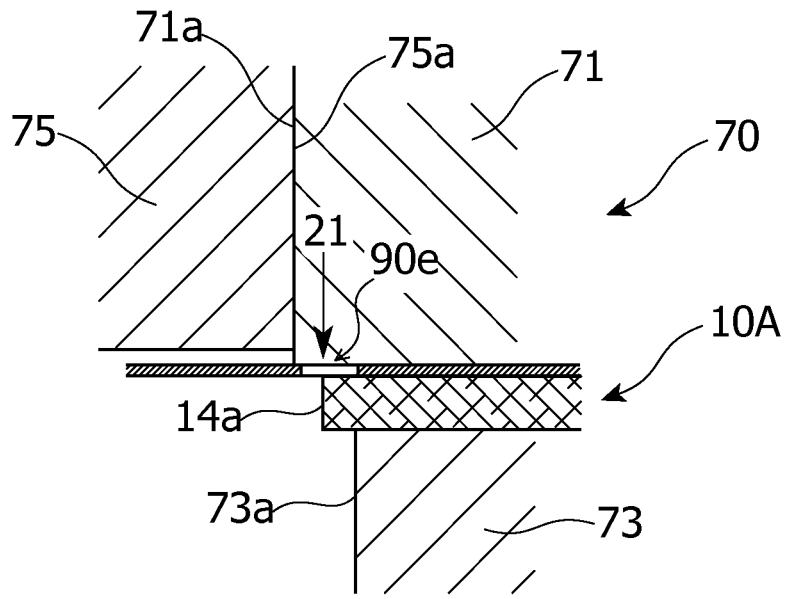
FIG. 6B illustrates a process of holding the laminated material of FIG. 6A.
Figure 6C:
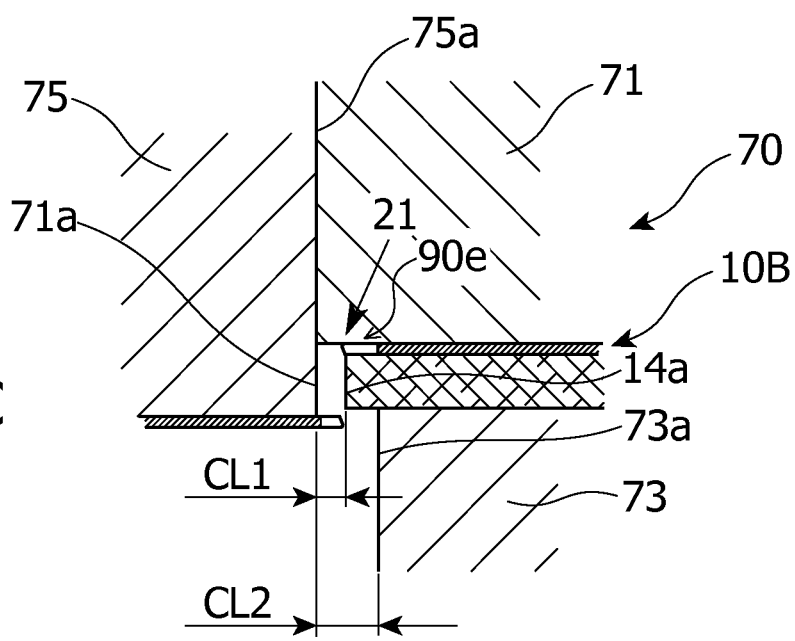
FIG. 6C illustrates a process of cutting the laminated material of FIG. 6A.
Figure 7:
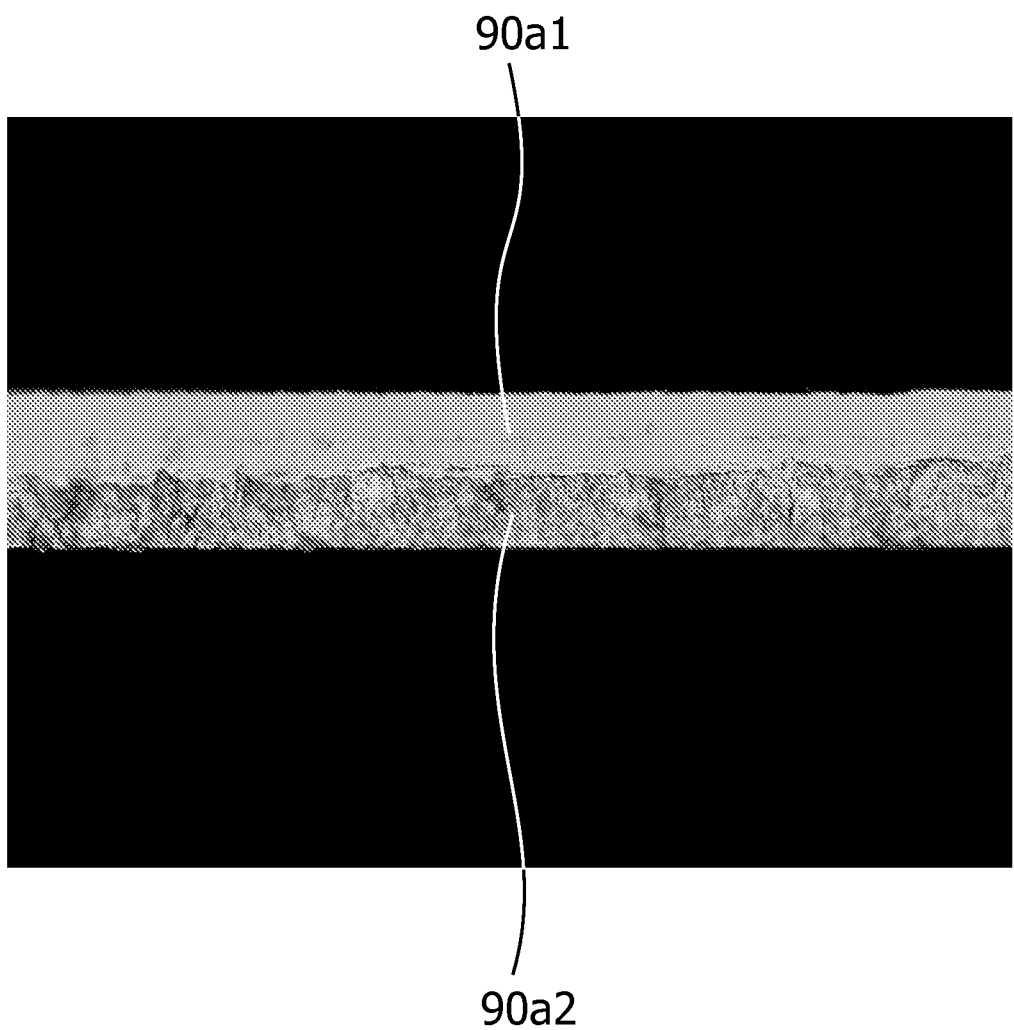
FIG. 7 is a photograph showing a cut section of a laminated material cut with the use of the easy cut part 90a of FIG. 5A.
Figure 8:
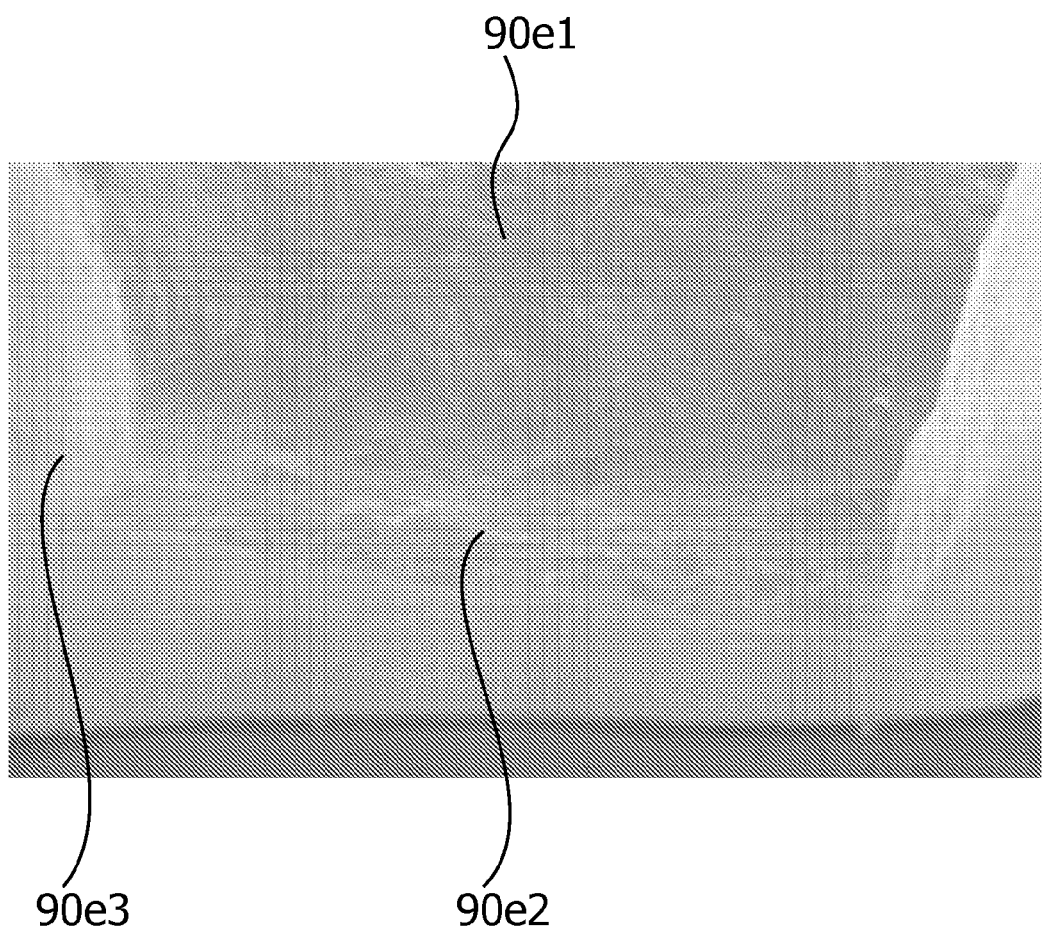
FIG. 8 is a photograph showing a cut section of a laminated material cut with the use of the easy cut part 90e of FIGS. 5E and 5F.

FIG. 6A illustrates the frame 12 having the easy cut part 90e and the stiffener 14 of the half-finished head suspension 10A, FIG. 6B illustrates a process of holding the frame 12 and stiffener 14, FIG. 6C illustrates a process of cutting the frame 12, FIG. 7 is a photograph showing a cut section of a laminated material cut with the use of the easy cut part 90a of FIG. 5A, and FIG. 8 is a photograph showing a cut section of a laminated material cut with the use of the easy cut part 90e of FIGS. 5E and 5F.

The processes illustrated in FIGS. 6A to 6C are basically the same as those of FIGS. 4A to 4C, and therefore, the same parts are represented with the same reference marks to omit overlapping explanations.

The easy cut part 90a according to Example 1 employed in FIGS. 4A to 4C is subjected to no special process along the boundary 21 on the frame 12.

The easy cut part 90e according to Example 4 employed in FIGS. 6A to 6C involves two through holes 90e3 formed in the frame 12 on the boundary 21 and three straight grooves 90e1 formed on each side of the through holes 90e3 by partial etching up to a tip of the boundary 21. This is a fundamental difference of Example 4 from Example 1.

The head suspension 10B (FIG. 4C) cut from the frame 12 having the easy cut part 90a of Example 1 (FIG. 5A) has a cut section mainly made under a shear mode as shown in FIG. 7.

In FIG. 7, the cut section includes an upper part 90a1 and a lower part 90a2. The upper part 90a1 shows that burrs and particles are produced and the lower part 90a2 shows that burrs and particles are suppressed. From this, it is understood that the upper part 90a1 is cut in the shear mode and the lower part 90a2 is cut in a fracture mode.

On the other hand, the head suspension 10B (FIG. 6C) cut from the frame 12 having the easy cut part 90e of Example 4 (FIGS. 5E and 5F) has a cut section mainly made under the fracture mode as shown in FIG. 8.

In FIG. 8, the cut section includes a thinned part 90e1 formed by partial etching and a cut part 90e2 under the thinned part 90e1. A reference mark 90e3 is the through hole formed in the frame 12. The cut part 90e2 shows that burrs and particles are suppressed. From this, it is understood that the frame 12 having the easy cut part 90e is mainly cut in the fracture mode.

In this way, the head suspension 10B cut along the easy cut part 90e of Example 4 or any one of Examples 2, 3, 5 and 6 has a cut section formed in the fracture mode due to a reduced cross section along the easy cut part and an increased distance CL1. Using the easy cut parts of Examples 2 to 6, therefore, effectively reduces burrs and particles when cutting the half-finished head suspension 10A from the frame 12 into the head suspension 10B.

As mentioned above, the laminated material cutting method according to the embodiment cuts the frame (second plate) 12 with the use of the stiffener (first plate) 14 as a die to cut the frame 12. Even if the stiffener 14 is made of a weak material, the cutting is properly executable because the stiffener 14 is used as a die only once. At this time, the clamp base 73 is not required to serve as a die and is only required to support the half-finished head suspension (laminated material) 10A at a predetermined position. The clamp base 73, therefore, is little damaged during the cutting. This reduces the number of times of maintenance of the clamp base 73, thereby reducing the number of manufacturing processes of the head suspension.

According to the embodiment, there is no need of precise management of the degrees of roughness for the edge part 71a of the pad 71 and the edge part 75a of the punch 75. This results in reducing the number of manufacturing processes of the head suspension.

According to the embodiment, there is no need of precisely managing a positioning accuracy of the half-finished head suspension 10A with respect to the cutting apparatus 70. This results in reducing the number of manufacturing processes of the head suspension.

To cut the frame 12 with a high positioning accuracy, the present invention may use cutting tools (71, 73, 75) made of inexpensive material whose abrasion resistance is relatively low and whose accuracy is relatively poor. This results in reducing the manufacturing cost of the head suspension.

The stiffener (first plate) 14 used as a die is one of the parts of the head suspension 10B. Accordingly, the present invention is achievable without increasing the number of parts of the head suspension 10B.

A laminated material to which the laminated material cutting method of the present invention is applicable will be explained.

The laminated material is made of at least two plates, i.e., first and second plates. For example, the laminated material is the half-finished head suspension 10A, the first plate is the stiffener 14 of the half-finished head suspension 10A, and the second plate is the frame 12 integral with the hinge member 19 onto which the stiffener 14 is laid and fixed. A part of the frame (second plate) 12 protruding from the edge 14a of the stiffener (first plate) 14 is cut from the frame 12 with the stiffener 14 serving as a die to execute the cutting. The frame 12 has the boundary 21 at a position corresponding to the edge 14a of the stiffener 14 and the easy cut part (one of 90a to 90h) along the boundary 21.

The easy cut part may be made by making a sectional area of the frame 12 smaller than a sectional area of the stiffener 14.

The easy cut part may be one selected from the group consisting of a groove, a hole, and a combination thereof. The groove (90b1, 90c1) may be made by partial etching.

A method of manufacturing a head suspension according to an embodiment of the present invention will be explained. The head suspension corresponds to the head suspension 10B (FIGS. 1C, 4C, 6C) made from the half-finished head suspension 10A (FIGS. 1B, 4B, 6B) according to the laminated material cutting method of the present invention.

As illustrated in FIGS. 3 to 4C, the head suspension manufacturing method includes the holding process (step S17a) and the cutting process (step S17b). Head suspension parts and the frame 12 are laid one on another, are fixed together, and are held between the pad 71 and the clamp base 73 in the holding process (step S17a), the frame 12 having a number of half-finished head suspensions 10A chained side by side. A part of the frame 12 protruding from the edge 14a of the stiffener 14 of the held half-finished head suspension 10A is cut from the frame 12 by moving the punch 75 along the pad 71.

As illustrated in FIGS. 4B and 6B, the holding process (step S17a) positions the edge 14a of the stiffener 14 between the edge part 71a of the pad 71 and the edge part 73a of the clamp base 73.

As illustrated in FIGS. 4C and 6C, the cutting process (step S17b) moves the punch 75 in a direction from the frame 12 toward the stiffener 14 with the stiffener 14 being used as a die to cut the frame 12.

In this way, the head suspension manufacturing method according to the embodiment cuts the frame (first plate) 12 with the stiffener (first plate) 14 serving as a die to cut the frame 12. Even if the stiffener 14 is made of a weak material, the cutting is properly executable because the stiffener 14 is used as a die only once. At this time, the clamp base 73 is not required to serve as a die and is only required to support the half-finished head suspension (laminated material) 10A at a predetermined position. The clamp base 73, therefore, is little damaged during the cutting. This reduces the number of times of maintenance of the clamp base 73, thereby reducing the number of manufacturing processes of the head suspension.

According to the embodiment, there is no need of precise management of the degrees of roughness for the edge part 71a of the pad 71 and the edge part 75*a* of the punch 75. This results in reducing the number of manufacturing processes of the head suspension.

According to the embodiment, there is no need of precisely managing a positioning accuracy of the half-finished head suspension 10A with respect to the cutting apparatus 70. This results in reducing the number of manufacturing processes of the head suspension.

To cut the frame 12 with a high positioning accuracy, the present invention may use cutting tools (71, 73, 75) made of inexpensive material whose abrasion resistance is relatively low and whose accuracy is relatively poor. This results in reducing the manufacturing cost of the head suspension.

The stiffener (first plate) 14 used as a die is one of the parts of the head suspension 10B. Accordingly, the present invention is achievable without increasing the number of parts of the head suspension 10B.

When the easy cut part (one of 90*a* to 90*h*) is formed along the boundary 21 of the frame 12, the frame 12 is cut along the boundary 21 mainly in the fracture mode. This effectively reduces burrs and particles during the cutting.

This results in greatly reducing dust during head suspension manufacturing and improving the productivity of head suspensions. A magnetic disk drive incorporating the head suspension manufactured according to the present invention produces little dust, thereby improving the reliability of the magnetic disk drive.

A part of the head suspension serving as the first plate may be not only the stiffener 14 but also the base plate 11, the load beam 13, or any other part of the head suspension.

The frame 12 may have one of the easy cut parts 90*a* to 90*h* along the boundary 21 corresponding to the edge 14*a* of the stiffener 14.

The easy cut part may be made by making a sectional area of the frame (second plate) 12 smaller than a sectional area of the stiffener (first plate) 14.

The easy cut part may be one selected from the group consisting of a groove, a hole, and a combination thereof. The groove may be made by partial etching.

The head suspension manufactured according to the above-mentioned method is highly reliable.

The present invention is not limited to the above-mentioned embodiments. The embodiments are modifiable without departing from the gist and technical idea of the present invention stipulated and suggested in the claims and specification. Laminated material cutting methods, laminated materials, head suspension manufacturing methods, and head suspensions based on such modifications also fall in the scope of the present invention.

The embodiments have been explained on the basis that the hinge members 19 are integral with the frame 12 and are chained side by side on the frame 12. The present invention is not limited to this configuration. Head suspension parts such as the base plates 11, load beams 13, and stiffeners 14 may be integral with their respective frames and joined together. To cut such frames, the present invention is applicable.

According to the above-mentioned embodiments, the easy cut part is thinned or grooved by partial etching. The present invention is not limited to this. For example, the easy cut part may be thinned or grooved by pressing or any other processing.

What is claimed is:

1. A method of cutting a laminated material made of at least first and second plates that are laid one on another and fixed together, comprising:
    preparing the laminated material in which the first and second plates are laid on one another in a first direction, thereby protruding a part of the second plate from an edge of the first plate in a second direction intersecting the first direction to form a protrusion;
    holding a layered portion of the laminated material between a pad and a clamp base that are discrete parts with respect to the laminated material in the first direction, so that the edge of the first plate is positioned between an edge of the pad and an edge of the clamp base in the second direction; and
    cutting the protrusion of the second plate by moving a punch along the pad in the first direction from the second plate toward the first plate, thereby using the first plate as a die to cut the protrusion of the second plate.

2. The method of claim 1, wherein:
    the first plate is one of a base plate, load beam, and stiffener that form a head suspension; and
    the second plate is a frame on which half-finished head suspensions are chained one to another.

3. A method of manufacturing a head suspension from a laminated material, the laminated material including a half-finished head suspension and a frame onto which the half-finished head suspension is laid and fixed, the frame having a plurality of such half-finished head suspensions in a chained state, the method comprising:
    forming the laminated material in which the half-finished head suspension is laid onto the frame in a first direction, thereby protruding a part of the frame from an edge of the half-finished head suspension in a second direction intersecting the first direction to form a protrusion;
    holding a layered portion of the laminated material between a pad and a clamp base that are discrete parts with respect to the laminated material in the first direction, so that said edge of the half-finished head suspension is positioned between an edge of the pad and an edge of the clamp base in the second direction; and
    cutting the protrusion of the frame by moving a punch along the pad in the first direction from the frame toward the part of the half-finished head suspension, thereby using the half-finished head suspension as a die to cut the protrusion of the frame.

4. The method of claim 3, wherein: a part of the half-finished head suspension having said edge is one of a base plate, load beam, and stiffener.

5. The method of claim 3, wherein: the frame has an easy cut part at least at a position corresponding to said edge of the half-finished head suspension.

6. The method of claim 5, wherein:
    the easy cut part is formed by making a cross-sectional area of the frame thinner than a cross-sectional area of the part of the half-finished head suspension.

7. The method of claim 5, wherein:
    the easy cut part includes one selected from the group consisting of a groove, a through hole, and a combination thereof.

8. The method of claim 7, wherein:
    the groove is formed by partial etching.

* * * * *